(12) United States Patent
Nagai et al.

(10) Patent No.: US 7,233,111 B2
(45) Date of Patent: Jun. 19, 2007

(54) ILLUMINATION DEVICE

(75) Inventors: Kentaro Nagai, Haibara-gun (JP);
Shinji Yamada, Yokohama (JP);
Shingo Chiba, Haibara-gun (JP);
Haruyuki Matsushita, Yokohama (JP)

(73) Assignee: Yazaki Corporation, Tokyo (JP)

( * ) Notice: Subject to any disclaimer, the term of this patent is extended or adjusted under 35 U.S.C. 154(b) by 232 days.

(21) Appl. No.: 11/124,398

(22) Filed: May 9, 2005

(65) Prior Publication Data

US 2005/0284740 A1    Dec. 29, 2005

(30) Foreign Application Priority Data

| May 10, 2004 | (JP) | ............................ P. 2004-140345 |
| Jul. 28, 2004 | (JP) | ............................ P. 2004-220554 |
| Apr. 18, 2005 | (JP) | ............................ P. 2005-119615 |

(51) Int. Cl.
*B60Q 1/14* (2006.01)

(52) U.S. Cl. ........................ 315/77; 315/84; 362/543

(58) Field of Classification Search .................. 315/77, 315/80, 84, 295, 362; 362/543–545; 307/10.1, 307/10.8; 200/1 R, 5 R, 252, 310, 547–550, 200/312; 439/76.1, 76.2, 218, 505
See application file for complete search history.

(56) References Cited

U.S. PATENT DOCUMENTS

| 5,564,813 A | 10/1996 | Curtindale |
| 6,580,219 B1 | 6/2003 | Jones, III et al. |
| 2001/0051459 A1* | 12/2001 | Soga et al. ................. 439/516 |
| 2002/0027783 A1 | 3/2002 | Nagai |
| 2002/0067616 A1 | 6/2002 | Soga et al. |
| 2002/0093826 A1 | 7/2002 | Bos et al. |

FOREIGN PATENT DOCUMENTS

| DE | 100 65 541 C2 | 1/2003 |
| DE | 100 61 866 C2 | 5/2003 |
| JP | 2002-79879 A | 3/2002 |

* cited by examiner

*Primary Examiner*—Sandra O'Shea
*Assistant Examiner*—Mark Tsidulko
(74) *Attorney, Agent, or Firm*—Sughrue Mion, PLLC

(57) ABSTRACT

Each of illumination portions 30a includes a bulb terminal VT electrically connected to a first electrical contact 31a of a bulb 31 and a battery wire B, a courtesy terminal CT which is electrically connected to a third electrical contact 32d of a switch 32 and a bypass wire P, and can be electrically connected to a second electrical contact 31b of the bulb 31 when an electrical contact member 32f of the switch 32 is brought into a position of FIG. 5, and a switch terminal ST electrically connected to a first electrical contact 32b of the switch 32 and a grounding wire G. The courtesy wire C and the bypass wire P can be electrically connected together by a mode-changing switch 33.

10 Claims, 9 Drawing Sheets

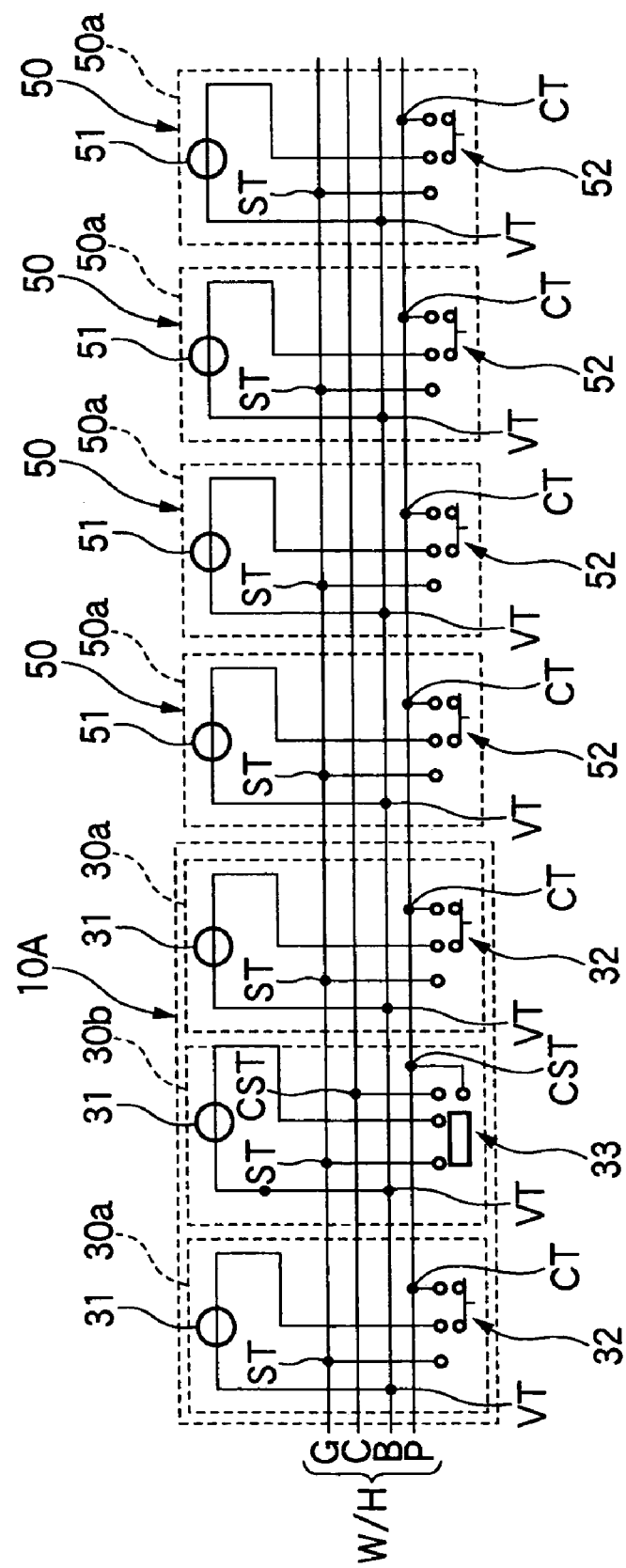

ILLUMINATION DEVICE

BACKGROUND OF THE INVENTION

1. Field of the Invention

This invention relates to an illumination device in which a light-emitting operation mode can be switched or changed by operating a mode-changing switch.

2. Related Art

There are known various illumination devices, and for example, an illumination lamp is mounted on an interior wall of a ceiling of a room of a vehicle such as an automobile. There is known one example of such vehicle room illumination lamps which comprises a housing having an incandescent bulb (hereinafter referred to merely as "bulb") mounted therein, and a lens cover attached to this housing, and the bulb within the housing is turned on and off by operating a switch (see, for example, Unexamined Japanese Patent Publication 2002-79879)

Another example of such vehicle room illumination lamps is the type of illumination lamp (i.e., a so-called map lamp) including two illumination portions for respectively illuminating the driver's seat and the passenger's seat. In this vehicle room illumination lamp, bulbs of the two illumination portions are turned on respectively by operating switches of the two illumination portions.

In this vehicle room illumination lamp, a mode-changing switch is provided between the two illumination portions. By operating this mode-changing switch, the bulbs of the illumination portions are turned on and off in accordance with the opening and closing of a door of a vehicle. In recent years, such a vehicle room illumination lamp, thus having not only a light-emitting operation mode for merely turning on and off the bulbs of the two illumination portions but also a light-emitting operation mode (that is, a door opening/closing mode) for turning on and off the bulbs of the two illumination portions in accordance with the opening and closing of the vehicle door, has been used in many vehicles.

A three-conductor wire harness, having a battery wire, a grounding wire and a mode-changing courtesy wire, is used in a wiring circuit of the above second example of vehicle room illumination lamp. In each of the two illumination portions, a bulb terminal and a battery terminal are electrically connected to the battery wire and the grounding wire, respectively, and a courtesy terminal is connected to the courtesy wire. Further, in the mode-changing switch, two courtesy switch terminals are connected respectively to two electrically-separated end portions of that portion of the courtesy wire severed by stamping or the like. By switching this mode-changing switch, the separated wire portions of the courtesy wire can be electrically connected together and disconnected from each other.

In this circuit construction, the mode-changing switch for changing the light-emitting operation mode of the illumination portions by electrically connecting or disconnecting the separated wire portions of the courtesy wire need to be disposed closer to a DC power source for the wire harness. Therefore, the wire harness is connected to the mode-changing switch and the two illumination portions in this sequence from the power source.

In this wiring structure, the order of arrangement of the two illumination portions and the mode-changing switch on the housing (that is, one illumination portion, the mode-changing switch and the other illumination portion are arranged in this order on the housing) is different from the order of connection of the wire harness to the two illumination portions and the mode-changing switch. Therefore, the wire harness must be installed over a long distance in accordance with the arrangement of the illumination portions and mode-changing switch.

As a result, the installation of the wire harness as well as a holding structure of the housing becomes complicated, and therefore the assembling operation is cumbersome, and besides the wire harness has an increased length, so that the cost increases.

Furthermore, there is the type of vehicle equipped not only with such a vehicle room illumination lamp (that is, a so-called map lamp) but also with a vehicle room illumination lamp (that is, a so-called personal lamp) for illuminating a rear seat or others of the vehicle. In such an illumination lamp, a wiring circuit of the map lamp and a wiring circuit of the personal lamp are separate from each other, and therefore it is necessary to provide separate door opening/closing-mode courtesy wires, and therefore it is necessary to provide wire harnesses of different circuits. Similarly, two mode-changing switches need to be provided, so that the structure becomes complicated.

Thus, in the above vehicle room illumination lamp, the number and length of the wire harnesses increase, and also the number of the switches increases, and therefore the installation of the wire harnesses and the holding structure have become complicated, and the assembling operation has become cumbersome, and besides the cost has increased.

SUMMARY OF THE INVENTION

This invention has been made in view of the above circumstances, and an object of the invention is to provide an illumination device in which the number of wire harnesses, the length of the wire harness and the number of switches can be reduced so that the installation of the wire harness can be simplified, that an assembling operation can be effected easily and that the cost can be reduced.

According to the present invention, there is provided an illumination device comprising:

a plurality of illumination portions;

a mode-changing switch for changing a light-emitting operation mode of the plurality of illumination portions; and a wire harness including a first conductor, a second conductor, a third conductor and a fourth conductor which are electrically isolated from one another;

wherein the plurality of illumination portions and the mode-changing switch are electrically connected to the wire harness;

wherein the mode-changing switch is electrically connected to the second conductor and the fourth conductor, and can be switched between a short-circuited state in which the second conductor and the fourth conductor are electrically connected together and an open state in which the second conductor and the fourth conductor are electrically disconnected from each other; and wherein each of the plurality of illumination portions comprises:

a switch including a first electrical contact, a second electrical contact, a third electrical contact, and an electrical contact member which is movable between a first position where the electrical contact member is disposed in contact with the first and second electrical contacts to electrically connect the first and second electrical contacts together, and is disposed out of contact with the third electrical contact and a second position where the electrical contact member is disposed in contact with the second and third electrical contacts to electrically connect the second and third electrical contacts together, and is disposed out of contact with the first electrical contact;

a light source including a first electrical contact, and a second electrical contact electrically connected to the second electrical contact of the switch;

a first electrical terminal electrically connected to the first electrical contact of the light source and the first conductor;

a second electrical terminal which is electrically connected to the third electrical contact of the switch and the fourth conductor, and can be electrically connected to the second electrical contact of the light source when the electrical contact member of the switch is brought into the second position; and a third terminal electrically connected to the first electrical contact of the switch and the third conductor.

In this illumination device, the fourth conductor is provided, and with this construction the mode-changing switch can be arranged on the wire harness, for example, between the two illumination portions. Namely, for example, when mounting the two illumination portions and the mode-changing switch on a housing, the order of arrangement of these portions (that is, the order of arrangement of one illumination portion, the mode-changing switch and the other illumination portion) can be caused to coincide with the order of connection of the two illumination portions and the mode-changing switch to the wire harness. Therefore, the wire harness, having a reduced length, can be used. Therefore, the installation of the wire harness can be quite simplified, and besides a holding structure of the housing can be simplified. Therefore, the installation of the wire harness can be simplified, and the assembling operation can be effected easily, and the cost can be reduced. And besides, the second conductor does not need to be cut or severed.

In the illumination device of the invention, preferably, there is a potential difference between the first conductor and the third conductor, and when the mode-changing switch is in the short-circuited state, and the electrical contact member of the switch of at least one of the plurality of illumination portions is disposed in the second position so as to light the light source of the at least one illumination portion, the potential of the second conductor is generally the same as the potential of the third conductor.

In the illumination device of the invention, preferably, when the mode-changing switch is in the open state, and the electrical contact members of the switches of the plurality of illumination portions are disposed in their respective first positions, the fourth conductor is in an electrically-floating condition.

Preferably, the illumination device of the invention comprises a first lamp portion including at least two of the plurality of illumination portions, and the mode-changing switch, and a plurality of second lamp portions each including at least one of the plurality of illumination portions other than the at least two illumination portions of the first lamp portion, and the first lamp portion and the second lamp portions are arranged generally in a row on the wire harness.

In this illumination device, it is not necessary use a plurality of wire harnesses for the first lamp portion and the plurality of second lamp portions, and also it is not necessary to branch one wire harness, and the first lamp portion and the plurality of second lamp portions can be arranged on the single wire harness. Therefore, the wire harness can be reduced in length, and the wiring can be simplified. And besides, in this illumination device, not only the number of mode-changing switches can be reduced, but also the light-emitting operation mode-switching function for the illumination portions of all of the lamp portions can be provided in a concentrated manner on the single mode-changing switch, and therefore the overall structure of the illumination device can be simplified, and a lightweight design of the illumination device can be achieved, and the cost can be further reduced.

Preferably, the wire harness comprises a bundle of wires having the first, second, third and fourth conductors, respectively, and each of the wires has an electrically-insulating material covering an outer peripheral surface of the conductor.

The wire harness can comprise a flat cable which is integrally molded of an electrically insulating material in such a manner that the first, second, third and fourth conductors are arranged in parallel spaced relation to one another. In this case, the wiring operation can be more simplified, and the assembling operation can be effected more easily, and therefore the use of the flat cable is preferred.

According to another aspect of the invention, there is provided an illumination device comprising:

an illumination portion;

a mode-changing switch for changing a light-emitting operation mode of the illumination portion; and a wire harness including a first conductor, a second conductor, a third conductor and a fourth conductor which are electrically isolated from one another;

wherein the illumination portion and the mode-changing switch are electrically connected to the wire harness;

wherein the mode-changing switch is electrically connected to the second conductor and the fourth conductor, and can be switched between a short-circuited state in which the second conductor and the fourth conductor are electrically connected together and an open state in which the second conductor and the fourth conductor are electrically disconnected from each other; and wherein the illumination portion comprises:

a switch including a first electrical contact, a second electrical contact, a third electrical contact, and an electrical contact member which is movable between a first position where the electrical contact member is disposed in contact with the first and second electrical contacts to electrically connect the first and second electrical contacts together, and is disposed out of contact with the third electrical contact and a second position where the electrical contact member is disposed in contact with the second and third electrical contacts to electrically connect the second and third electrical contacts together, and is disposed out of contact with the first electrical contact;

a light source including a first electrical contact, and a second electrical contact electrically connected to the second electrical contact of the switch;

a first electrical terminal electrically connected to the first electrical contact of the light source and the first conductor;

a second electrical terminal which is electrically connected to the third electrical contact of the switch and the fourth conductor, and can be electrically connected to the second electrical contact of the light source when the electrical contact member of the switch is brought into the second position; and a third terminal electrically connected to the first electrical contact of the switch and the third conductor.

In this illumination device, the fourth conductor is provided, and with this construction the illumination portion and the mode-changing switch can be arranged on the wire harness without the need for cutting or severing the second conductor. Therefore, the installation of the wire harness can be simplified, and the assembling operation can be effected easily, and the cost can be reduced.

In this illumination device, preferably, there is a potential difference between the first conductor and the third conductor, and when the mode-changing switch is in the short-circuited state, and the electrical contact member of the switch of the illumination portion is disposed in the second position so as to light the light source of the illumination portion, the potential of the second conductor is generally the same as the potential of the third conductor.

In this illumination device, preferably, when the mode-changing switch is in the open state, and the electrical contact member of the switch of the illumination portion is disposed in the first position, the fourth conductor is in an electrically-floating condition.

In the case where the illumination device of the invention is a vehicle room illumination lamp adapted to be provided within a vehicle room of a vehicle, this is preferred since the above excellent effects and advantages are achieved.

In the present invention, the number of the wire harnesses, the length of the wire harness and the number of the switches can be reduced, and therefore the installation of the wire harness can be simplified, and the assembling operation can be effected easily, and the cost can be reduced.

BRIEF DESCRIPTION OF THE DRAWINGS

FIG. 10 is a wiring circuit diagram showing a circuit construction of a modified example of the applied example of FIG. 9 which includes a map lamp of the three-lamp type.

DETAILED DESCRIPTION OF THE PREFERRED EMBODIMENTS

A preferred embodiment of an illumination device of the present invention will now be described with reference to FIGS. 1 to 10. The embodiment of the invention, described here, is directed to the vehicle room illumination lamp provided within a room of a vehicle, and more specifically to a single map lamp having two illumination portions for respectively illuminating the driver's seat and the passenger's seat. Further, a combination of the map lamp and a plurality of personal lamps for illuminating a rear seat and others will be described as an applied example utilizing the advantage of the embodiment.

Figure 1:
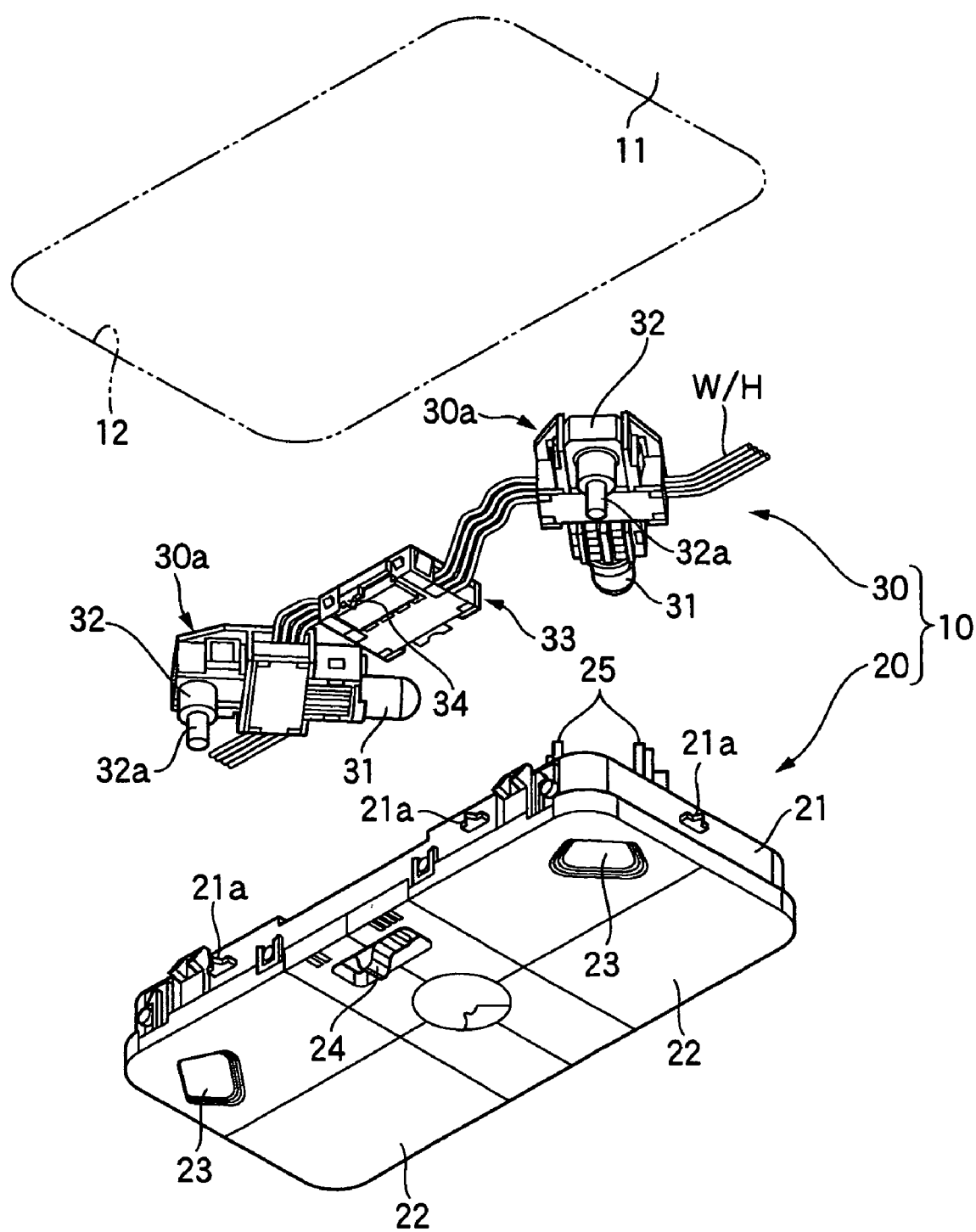
FIG. 1 is an exploded, perspective view of one preferred embodiment of an illumination device of the present invention as seen obliquely from the lower side within a vehicle room.

First, the structure of the map lamp will be described. FIG. 1 is an exploded, perspective view of the map lamp as seen obliquely from the lower side within the vehicle room, FIG. 2 is an exploded, perspective view of the map lamp as seen obliquely from the upper side, FIG. 3 is a perspective view of the map lamp in its assembled condition as seen obliquely from the upper side, and FIG. 4 is an exploded, perspective view of an illumination portion forming a function portion of the map lamp.

Figure 2:
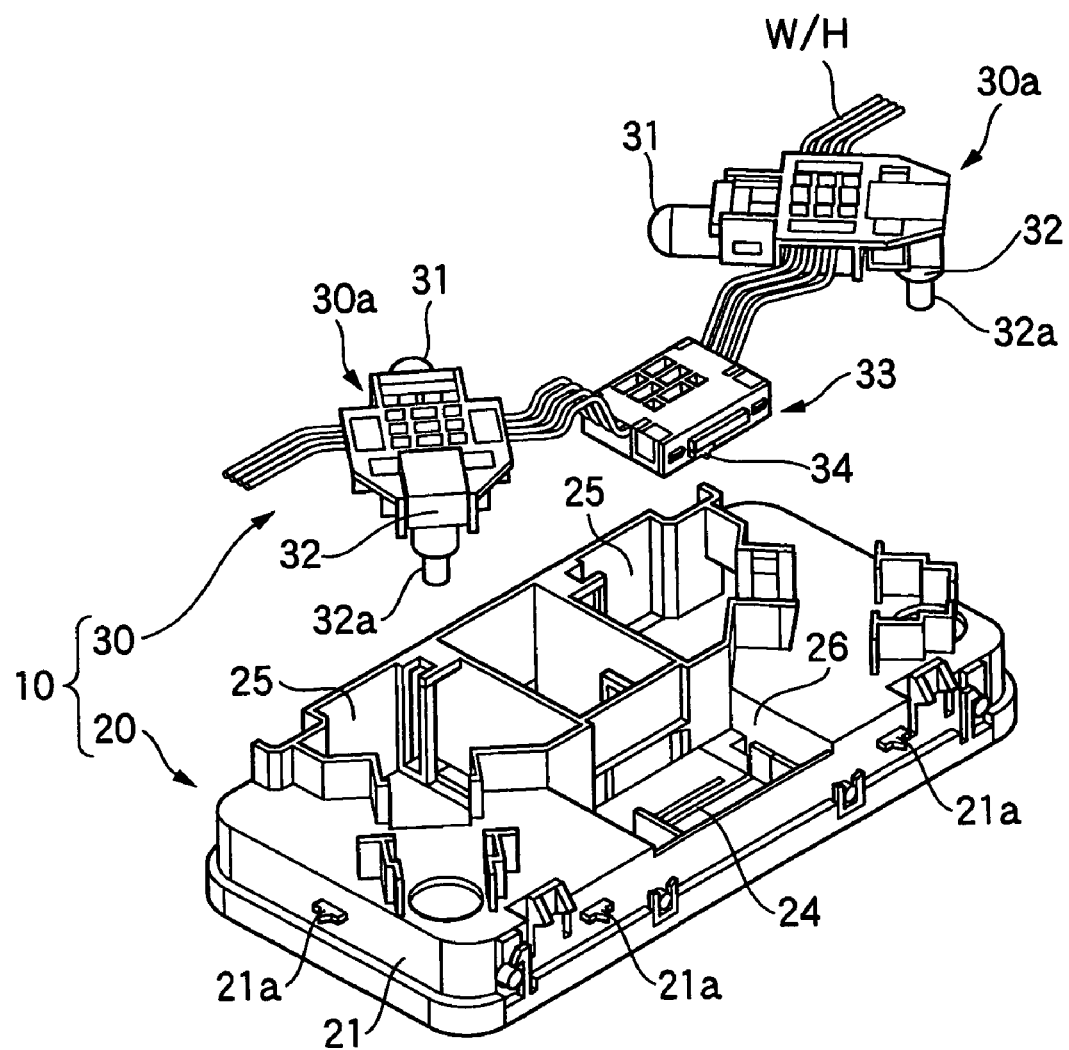
FIG. 2 is an exploded, perspective view of the illumination device as seen obliquely from the upper side.
Figure 3:
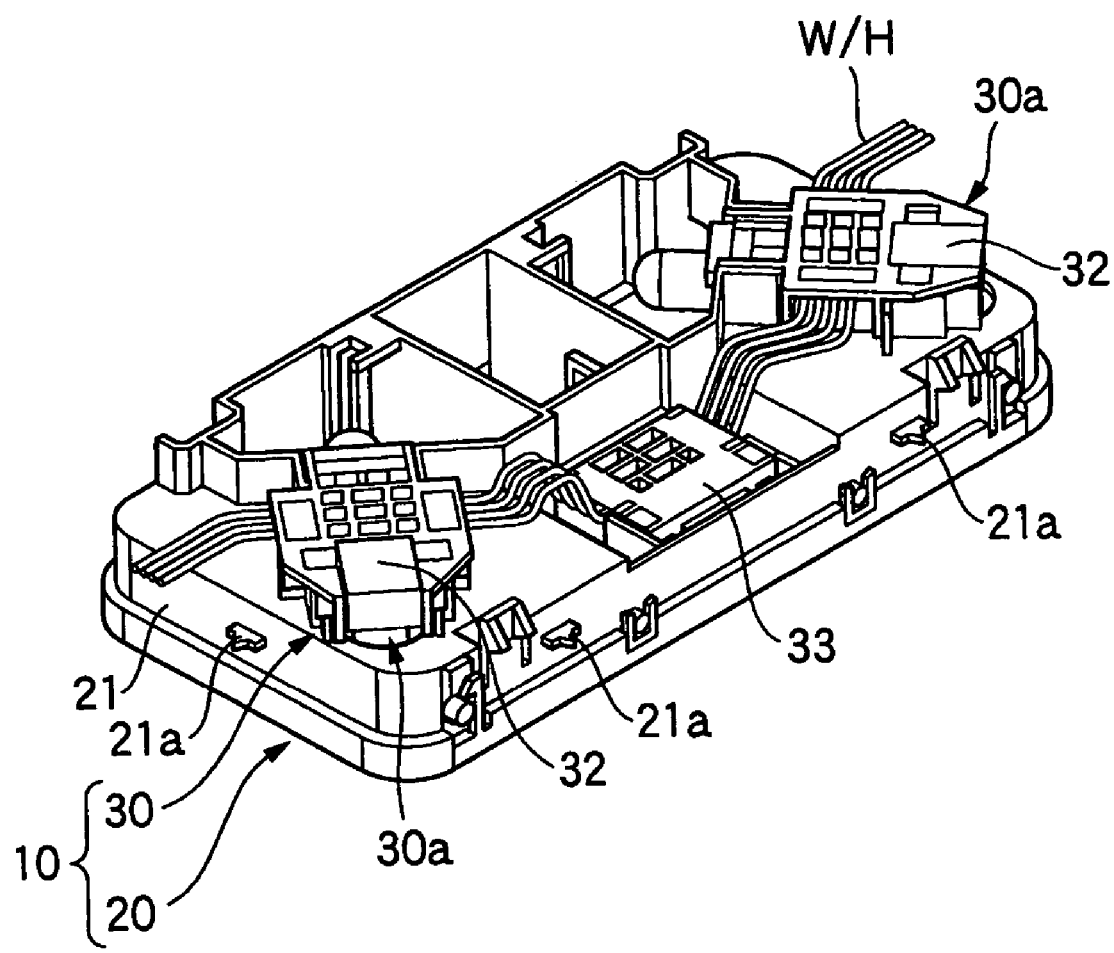
FIG. 3 is a perspective view of the illumination device in its assembled condition as seen obliquely from the upper side.
Figure 4:
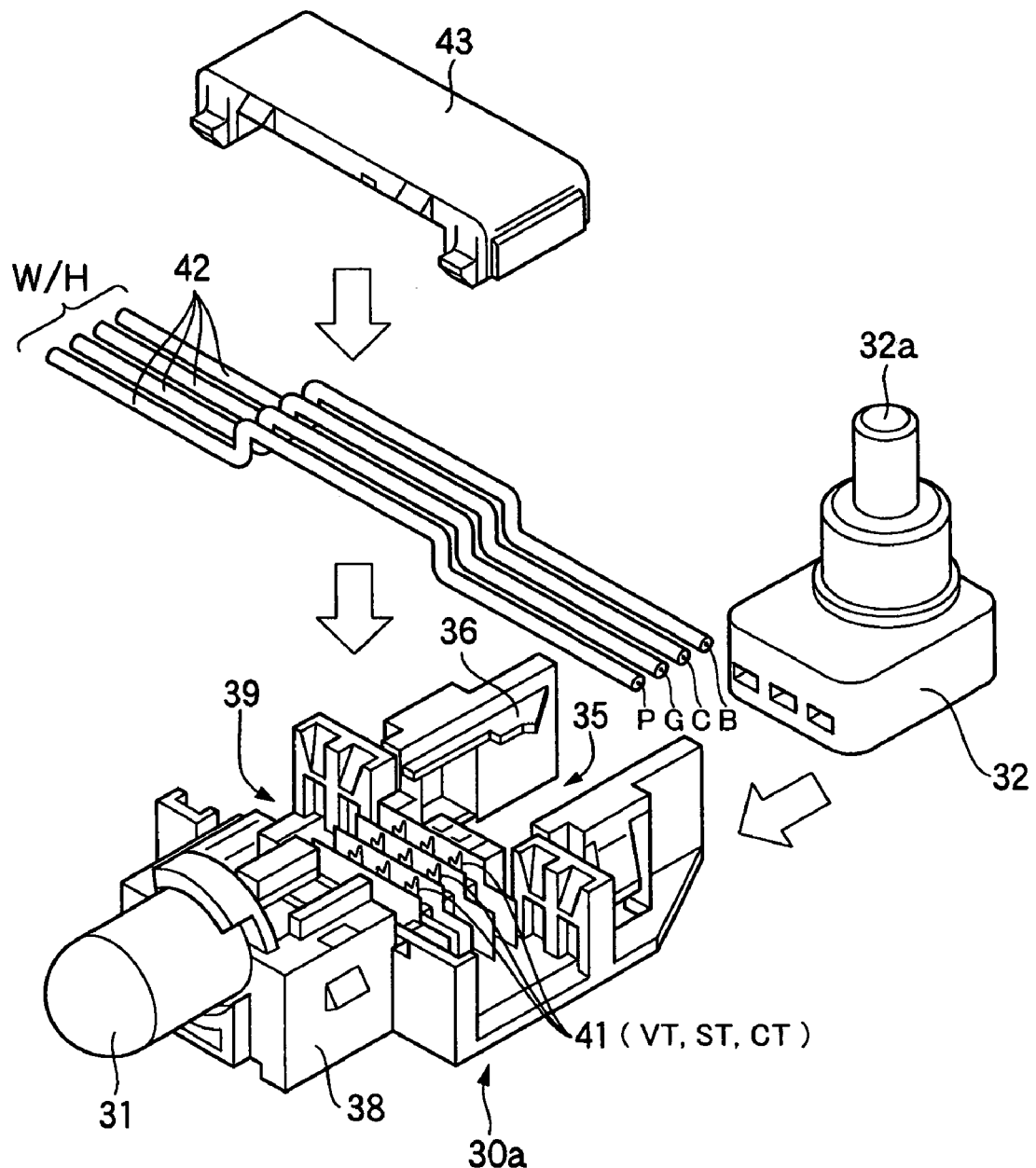
FIG. 4 is an exploded, perspective view of an illumination portion forming a function portion of the illumination device.

As shown in FIGS. 1 to 3, the map lamp 10 comprises a design portion 20 for mounting in an opening 12 formed in a ceiling plate (interior wall) 11 of a ceiling of the vehicle room, and the function portion 30 which is supported by the design portion 20, and is disposed on a reverse side of the ceiling plate 11.

The function portion 30 comprises the two illumination portions 30a, and a mode-changing switch 33. The illumination portions 30a and the mode-changing switch 33 are electrically connected to a power supply wire harness W/H electrically connected to a battery (DC power source) (not shown) or a DC power unit (not shown) for transforming a voltage of the battery.

Each of the illumination portions 30a includes a bulb (light source) 31, and a push-type switch 32 for supplying electric power from the wire harness W/H to the bulb 31 and for interrupting the supply of this electric power (that is, for supplying and interrupting the electric power). On the other hand, the mode-changing switch 33 is designed to switch a light-emitting operation mode (More specifically, a door opening/closing mode in accordance with the opening/closing of a door) of the bulbs 31 of the two illumination portions 30a.

The design portion 20 comprises a housing 21, and lenses 22 made of a transparent or translucent synthetic resin. A switch button 23 is provided at an end portion of each lens 22, and can be moved upward and downward. The switch 32 of the illumination portion 30a can be turned on and off when the occupant of the vehicle presses the switch button 23.

The map lamp 10, shown in FIGS. 1 to 3, has the pair of lenses 22 provided, for example, respectively for right and left seats. A thumbpiece 24 for a slide switch is slidably provided between the two lenses 22, and a thumbpiece 34 of the slide switch of the mode-changing switch 33 (which is provided at the function portion 30 so as to change the light-emitting operation mode of each of the two illumination portions 30a) can be operated through the thumbpiece 24.

Retaining projections 21a for mounting the housing 21 on the ceiling plate 11 are formed on an outer surface of the housing 21. As shown in FIG. 2, illumination fitting portions 25, corresponding respectively to the right and left lenses 22, are formed within the housing 21, and the illumination portions 30a can be fitted respectively in these illumination fitting portions 25. A switch fitting portion 26 in which the mode-changing switch 33 can be fitted is formed between the two illumination fitting portions 25.

When the two illumination portions 30a are fitted respectively into the right and left illumination fitting portions 25 of the design portion 20, each illumination portion 30a is positioned such that the bulb 31 thereof is disposed near to a rear surface of the corresponding lens 22, and also a distal end of a push portion 32a of the switch 32 thereof is disposed in proximity to or in contact with a rear surface of the corresponding switch 23.

When the mode-changing switch 33 is fitted into the switch fitting portion 26, the thumbpiece 34 of the mode-changing switch 33 can move in unison with the thumbpiece 24 for the slide switch. Therefore, when the occupant of the vehicle room slides the slide switch thumbpiece 24 exposed to the inside of the vehicle room, the thumbpiece 34 of the mode-changing switch 33 is slid to switch the light-emitting operation mode, and by doing so, the mode in which the bulbs 31 are turned on in accordance with the opening of the vehicle door or the bulbs 31 are turned off in accordance with the closing of the vehicle door can be selected. For making the switching operation by the mode-changing switch 33 effective or ineffective, the switches 32 of the illumination portions 30a are operated. For keeping the bulbs 31 in a lighted condition, also, the switches 32 of the illumination portions 30a are operated.

As shown in FIG. 4, each of the illumination portions 30a includes a receiving portion 35 (for receiving the switch 32) formed at one end portion of a body thereof, and guide rails 36 for guiding the switch 32 into the receiving portion 35 and for fixing the switch 32 in a predetermined position within the receiving portion 35.

The illumination portion 30a has a socket 38 formed at the other end of the body thereof. The bulb 31 is releasably mounted in this socket 38. Therefore, when the bulb 31 fails (for example, a filament of the bulb 31 is cut), the bulb 31 can be easily replaced by a new one.

An installation passageway 39 is formed in each illumination portion 30a, and extends across a central portion thereof. A plurality of press-contacting blades 41 of piercing terminals, forming a bulb terminal (first electrical terminal) VT, a courtesy terminal (second electrical terminal) CT and a switch terminal (third electrical terminal) ST, are disposed within this installation passageway 39.

The wire harness W/H, having four wires 42 (which are electrically isolated from one another), is installed along the installation passageway 39, and the wires 42 are suitably pressed against the press-contacting blades 41. By doing so, among a battery wire (first conductor) B, a courtesy wire (second conductor) C, a grounding wire (third conductor) G and a bypass wire (fourth conductor) P of the wires 42, the battery wire B, the grounding wire G and the bypass wire P are electrically connected to the switch 32 of the illumination portion 30a, and therefore electric power can be supplied to the illumination portion 30a. A strain relief cover 43 is attached to the body of the illumination portion 30a from the upper side of the wire harness W/H electrically connected to the press-contacting blades 41, and is fitted on this body. This strain relief cover 43 prevents the wires 42 from being disengaged from the respective press-contacting blades 41 upon application of a pulling force to the wire harness W/H. The wire harness W/H comprises a bundle of four wires 42 containing the conductors (that is, the battery wire B, the courtesy wire C, the grounding wire G or the bypass wire P), respectively, and each of the wires 42 has an electrically-insulating material, such as an electrical insulating synthetic resin, an electrical insulating rubber (silicon rubber) or the like, covering an outer peripheral surface of the corresponding conductor.

Figure 5:
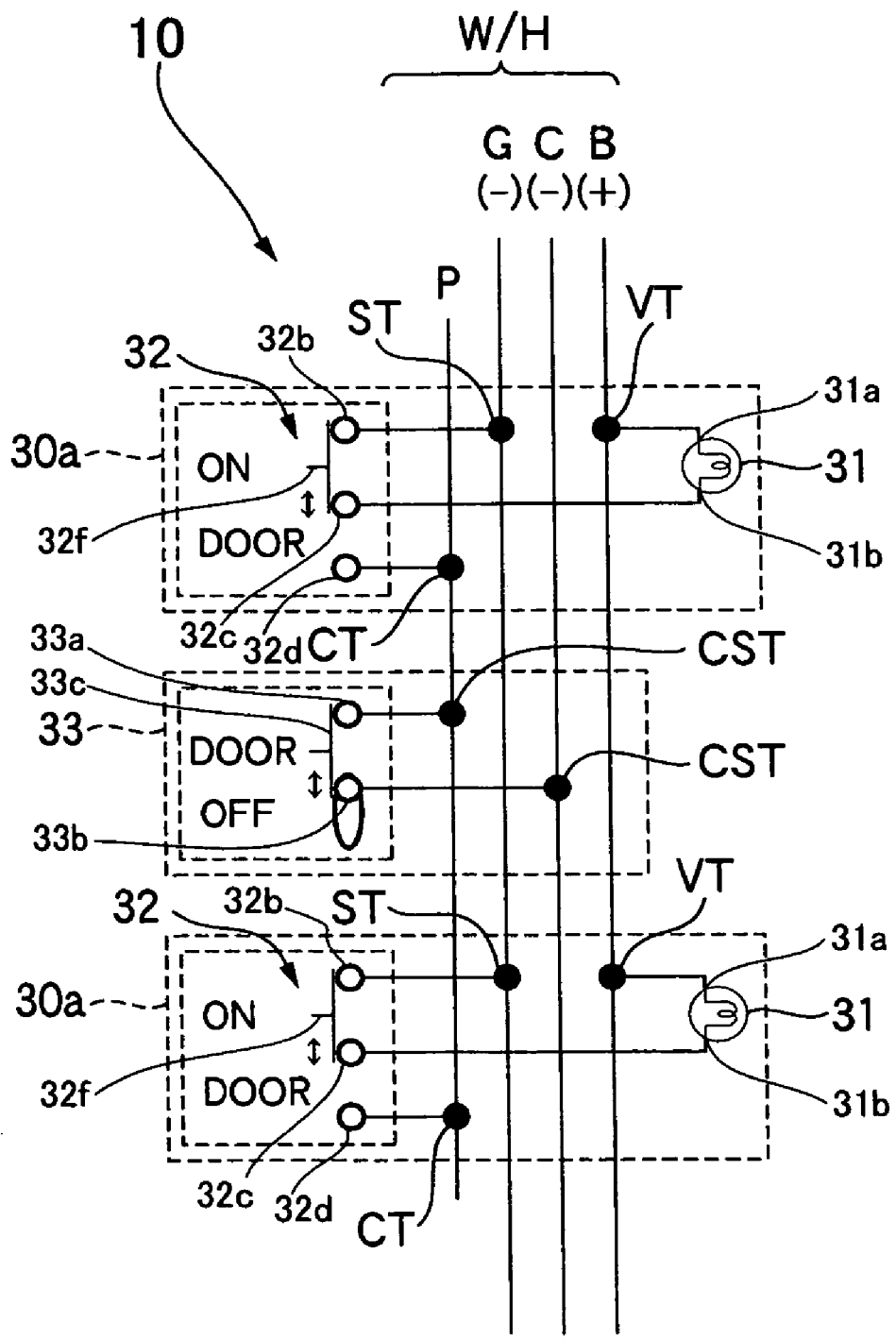
FIG. 5 is a wiring circuit diagram showing a circuit construction of the illumination device.

Next, the circuit construction of the map lamp 10 will be described. FIG. 5 is a wiring circuit diagram showing the circuit construction of the map lamp 10.

As shown in FIG. 5, the switch 32 of each illumination portion 30a includes a first electrical contact 32b, a second electrical contact 32c, a third electrical contact 32d, and an electrical contact member 32f which can be moved, upon pressing of the push portion 32a, between a first position (shown in FIG. 5) where the electrical contact member 32f is disposed in contact with the first electrical contact 32b and the second electrical contact 32c to electrically connect the two contacts 32b and 32c together, and is disposed out of contact with the third electrical contact 32d and a second position where the electrical contact member 32f is disposed in contact with the second electrical contact 32c and the third electrical contact 32d to electrically connect the two contacts 32c and 32d together, and is disposed out of contact with the first electrical contact 32b.

As shown in FIG. 5, the bulb 31 of each illumination portion 30a includes a first electrical contact 31a, and a second electrical contact 31b electrically connected to the second electrical contact 32c of the switch 32.

As shown in FIG. 5, each illumination portion 30a includes the bulb terminal VT electrically connected to the first electrical contact 31a of the bulb 31 and the battery wire B, the courtesy terminal CT which is electrically connected to the third electrical contact 32d of the switch 32 and the bypass wire P, and can be electrically connected to the second electrical contact 31b of the bulb 31 when the electrical contact member 32f of the switch 32 is brought into the second position, and the switch terminal ST electrically connected to the first electrical contact 32b of the switch 32 and the grounding wire G.

The mode-changing switch 33 includes two courtesy switch terminals CST, and one of the courtesy switch terminals CST is electrically connected to the courtesy wire C, while the other courtesy switch terminal CST is electrically connected to the bypass wire P. The mode-changing switch 33 also includes, as a switching portion, a first electrical contact 33a, a second electrical contact 33b, and an electrical contact member 33c. Therefore, the mode-changing switch 33 can be switched between a short-circuited state in which the courtesy wire C and the bypass wire P are electrically connected together and an open state in which the courtesy wire C and the bypass wire P are electrically disconnected from each other.

There is a predetermined potential difference between the battery wire B and the grounding wire G in order to supply electric power to the bulb 31 so that the bulb 31 can be lighted with predetermined brightness. In this embodiment, the battery wire B is electrically connected to a positive (+) output terminal of the DC power source, while the grounding wire G is electrically connected to a negative (−) output terminal of the DC power source.

When the mode-changing switch 33 is in the short-circuited state, and the electrical contact member 32f of the switch 32 of at least one of the illumination portions 30a is disposed in the second position so as to light the bulb 31 of this illumination portion 30a, the potential of the courtesy wire C is generally the same as the potential of the grounding wire G. More specifically, the potential of the courtesy wire C at this time is slightly higher or lower than the potential of the grounding wire G. In short, the courtesy wire C need only to have such a potential difference with respect to the battery wire B as to supply electric power to the bulb 31 to light the same with the predetermined brightness.

When the mode-changing switch 33 is in the open state, and the electrical contact members 32f of the switches 32 of the two illumination portions 30a are disposed in their respective first positions, the bypass wire P is in an electrically-floating condition.

In the map lamp 10 of this circuit construction, when the switch 32 of the illumination portion 30a is turned on upon pressing of the push portion 32a thereof through the switch button 23 of the design portion 20, electric current flows to the bulb 31 via the switch 32, so that this bulb 31 is lighted. When the push portion 32a is again pressed to turn off the switch 32, the supply of electric current to the bulb 31 is interrupted, so that the bulb 31 is turned off.

When the mode-changing switch 33 is switched to the door opening/closing mode (indicated by "DOOR" in FIG. 5) by operating the thumbpiece 34 thereof through the slide switch thumbpiece 24, the courtesy wire C and the bypass wire P are electrically connected together via this mode-changing switch 33 (FIG. 5 shows this condition).

In this condition, for example, when the door is opened, each bulb 31 is electrically connected to the courtesy wire C via the mode-changing switch 33, the bypass wire P and the switch 32 of the illumination portion 30a, so that electric current flows to this bulb 31 to light the same.

This map lamp 10 has the above circuit construction in which the bypass wire P is provided, and with this construction, when mounting the two illumination portions 30a and the mode-changing switch 33 on the housing 21, the order of arrangement of these portions (that is, the order of arrangement of one illumination portion 30a, the mode-changing switch 33 and the other illumination portion 30a) can be caused to coincide with the order of connection of the two illumination portions 30a and the mode-changing switch 33 to the wire harness W/H. Therefore, the wire harness W/H can be reduced in length, and the length of installation of the wire harness W/H can be reduced to a minimum.

Figure 6:
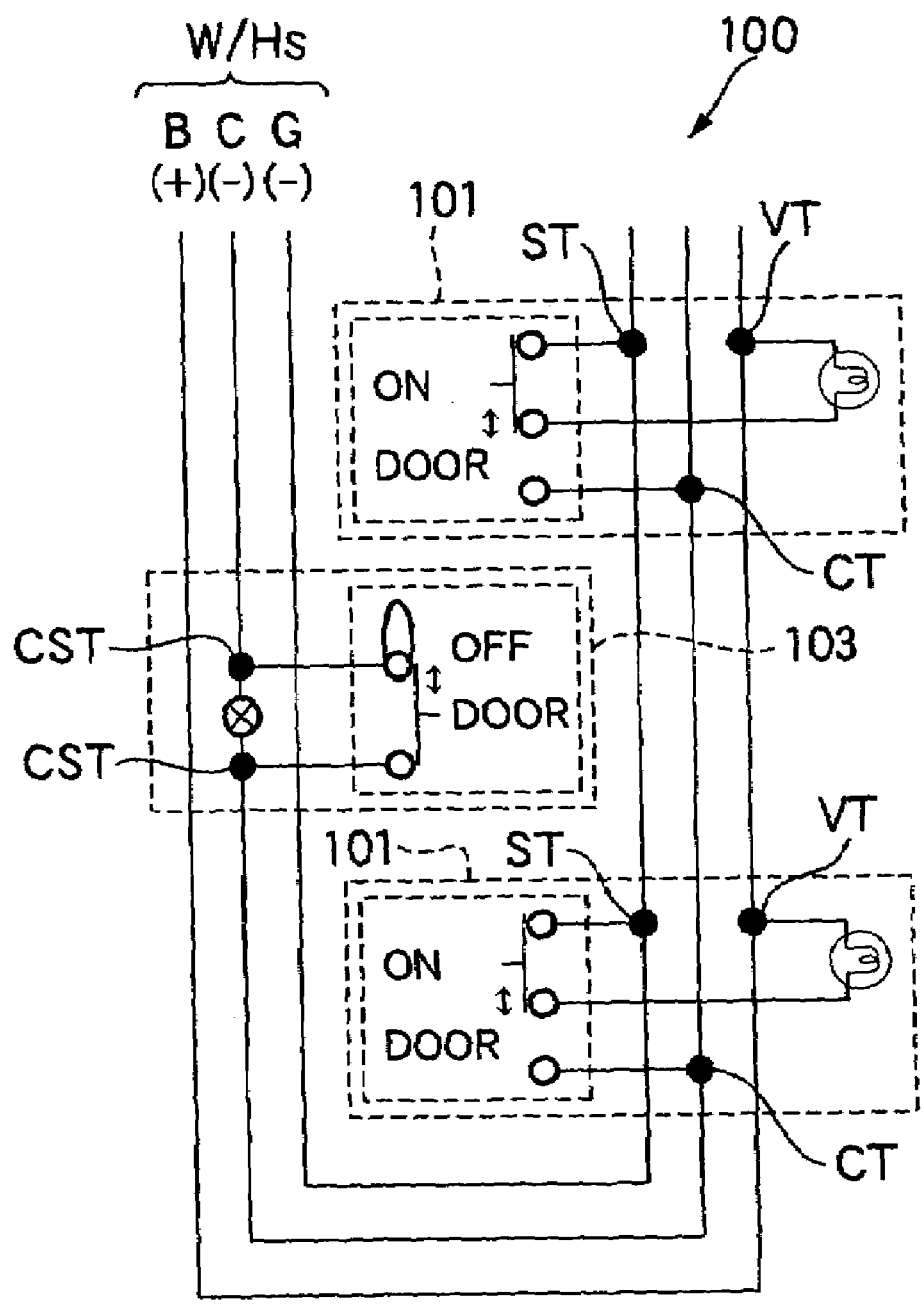
FIG. 6 is a wiring circuit diagram showing a circuit construction of a comparative example for the illumination device.
Figure 7:
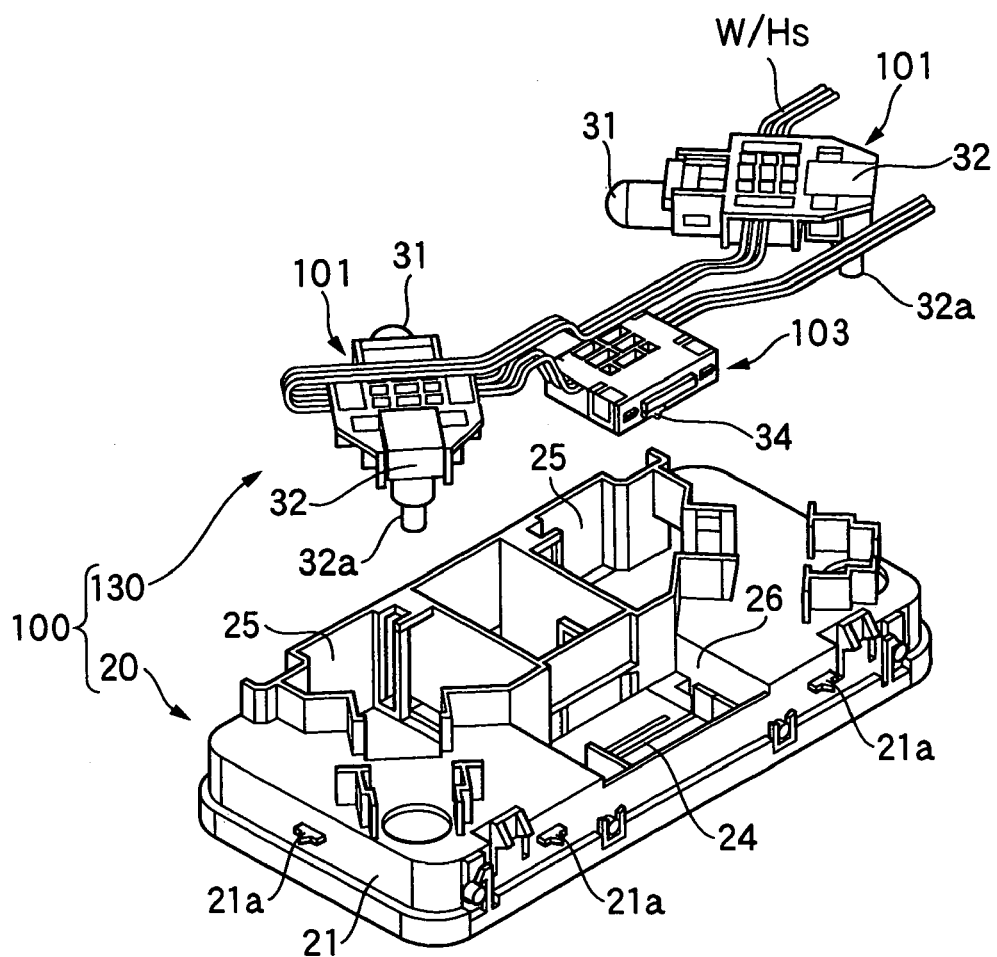
FIG. 7 is an exploded, perspective view of the comparative example for the illumination device as seen obliquely from the upper side.

Here, the case where a map lamp is constructed without the provision of the bypass wire P will be described with reference to FIGS. 6 and 7. FIG. 6 is a wiring circuit diagram showing a circuit construction of a comparative example 100 for the map lamp 10, and FIG. 7 is an exploded, perspective view of the comparative example 100 for the map lamp 10 as seen obliquely from the upper side. In FIGS. 6 and 7, similar portions to those of the above map lamp 10 will be designated by identical reference numerals, respectively, and explanation thereof will be simplified or omitted.

As shown in FIG. 6, in this comparative example 100 for the map lamp 10, there is used a wire harness W/Hs having a battery wire B, a grounding wire G and a courtesy wire C, and at each of illumination portions 101, a bulb terminal VT is connected to the battery wire B, and a switch terminal ST is connected to the grounding wire G, and a courtesy terminal CT is connected to the courtesy wire C. Further, in a mode-changing switch 103, two courtesy switch terminals CST are connected respectively to two electrically-separated end portions of that portion of the courtesy wire C severed by stamping or the like. By switching this mode-changing switch 103, the separated wire portions of the courtesy wire C can be electrically connected together and disconnected from each other.

In this circuit construction, however, the mode-changing switch 103 for changing the light-emitting operation mode of the illumination portions 101 by electrically connecting or disconnecting the separated wire portions of the courtesy wire C need to be disposed closer to a DC power source for the wire harness W/Hs. Therefore, the wire harness W/Hs is connected to the mode-changing switch 103 and the two illumination portions 101 in this sequence from the power source.

In this wiring structure, the order of arrangement of the two illumination portions 101 and the mode-changing switch 103 on a housing 21 (that is, one illumination portion 101, the mode-changing switch 103 and the other illumination portion 101 are arranged in this order on the housing 21) is different from the order of connection of the wire harness W/Hs to the two illumination portions 101 and the mode-changing switch 103. Therefore, the wire harness W/Hs must be installed over a long distance in accordance with the arrangement of the illumination portions 101 and mode-changing switch 103.

Namely, the order of arrangement of the illumination portions 101 and the mode-changing switch 103 on the housing 21 is different from the order of connection of the illumination portions 101 and the mode-changing switch 103 to the wire harness W/Hs. Therefore, in accordance with the arrangement of the illumination portions 101 and the mode-changing switch 103, the wire harness W/Hs must be installed in such a manner that it is turned or folded back halfway.

As a result, the installation of the wire harness W/Hs as well as a holding structure of the housing 21 becomes complicated, and therefore the assembling operation is cumbersome, and besides the wire harness W/Hs has an increased length, so that the cost increases.

On the other hand, in the map lamp 10, the bypass wire P is provided, and with this construction the mode-changing switch 33 can be arranged on the wire harness W/Hs between the two illumination portions 30a as shown in FIGS. 1 to 3. Namely, when mounting the two illumination portions 30a and the mode-changing switch 33 on the housing 21, the order of arrangement of these portions (that is, the order of arrangement of one illumination portion 30a, the mode-changing switch 33 and the other illumination portion 30a) can be caused to coincide with the order of connection of the two illumination portions 30a and the mode-changing switch 33 to the wire harness W/H. Therefore, the installation of the wire harness W/H can be quite simplified since it does not need to be turned back halfway, and therefore the wire harness W/H can be reduced in length. Thus, the installation of the wire harness W/H can be effected easily, and besides the holding structure of the housing 21 can be simplified. Therefore, the installation of the wire harness can be simplified, and the assembling operation can be effected easily, and the cost can be reduced. And besides, the courtesy wire C does not need to be cut or severed halfway by stamping or the like.

The bypass wire P need to be provided only at the function portion 30.

Instead of the above-mentioned wire harness W/H comprising the wires 42, there can be used a flat cable which is integrally molded of an electrically insulating material such as an electrical insulating synthetic resin, an electrical insulating rubber (silicon rubber) or the like in such a manner that a battery wire B, a courtesy wire C, a grounding wire G and a bypass wire P are arranged in parallel spaced relation to one another. By using such a flat cable, the operation for installing the wiring on the map lamp 10 can be more simplified, and therefore the assembling operation of the map lamp 10 can be effected more easily.

Figure 8:
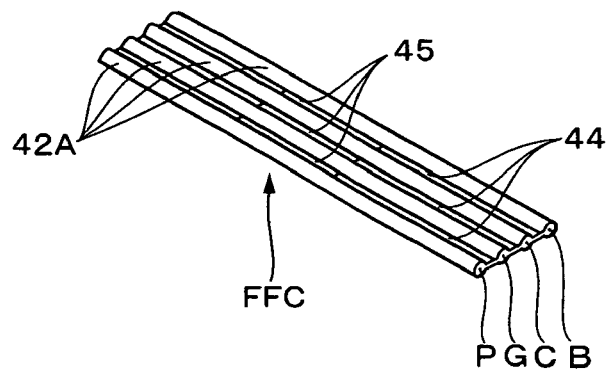
FIG. 8 is a perspective view showing one example of flat cable.

One example of such flat cable is shown in FIG. 8. In this flexible flat cable FFC, wires 42a are interconnected by thinned portions (reduced-thickness portions) 44. Slits 45 are formed through the thinned portions, and when the flexible flat cable FFC is pressed against the plurality of press-contacting blades 41 of the piercing terminals of the illumination portion 30a, partition walls (which are formed on the body of the illumination portion 30a, and are disposed between the rows of press-contacting blades 41) are allowed to escape (that is, pass) through the slits 45.

ANOTHER EXAMPLE

Figure 9:
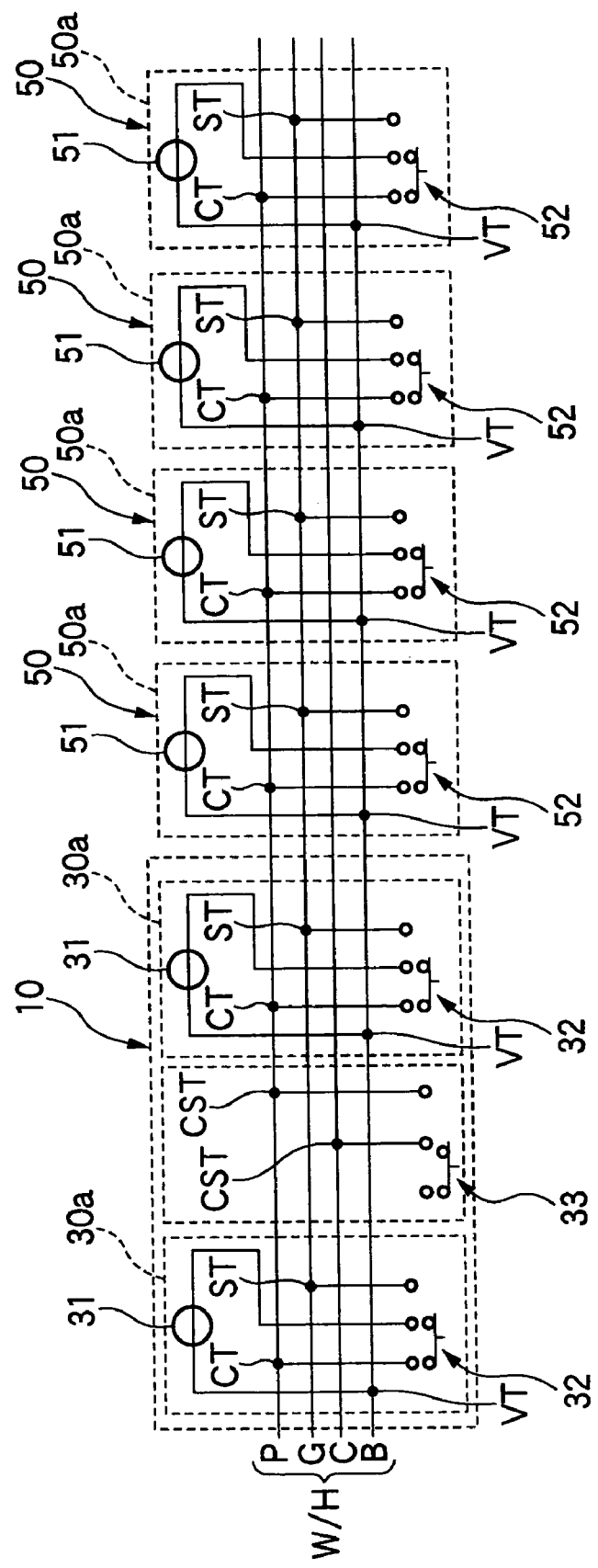
FIG. 9 is a wiring circuit diagram showing a circuit construction of an applied example of the embodiment of the illumination device of the invention.

The map lamp 10, including the two illumination portions for respectively illuminating the driver's seat and the passenger's seat, has been described above as the preferred embodiment of the illumination device of the invention. Here, a combination of the map lamp 10 and a plurality of personal lamps for illuminating a rear seat and others will be described as an applied example, utilizing the advantage of the map lamp 10, with reference to FIG. 9. FIG. 9 is a wiring circuit diagram showing a circuit construction of the applied example of the embodiment of the illumination device of the invention. In FIG. 9, similar portions to those of the above map lamp 10 will be designated by identical reference numerals, respectively, and explanation thereof will be simplified or omitted.

As shown in FIG. 9, the applied example of the embodiment of the illumination device of the invention comprises the map lamp 10 as a first lamp portion, and the personal lamps 50 as second lamp portions. Like the map lamp 10, each of the personal lamps 50 includes a bulb 51, and an illumination portion 50a having a switch 52. The personal lamp 50 further includes a housing (not shown) (which holds the illumination portion 50a, and can be fixed to an interior wall within a vehicle room), and a lens (not shown) covering the illumination portion 50a.

The personal lamps 50 are electrically connected to a wire harness W/H, connected to the map lamp 10, in such a manner that these personal lamps 50 are arranged in a row on the wire harness W/H.

In the applied example of FIG. 9 including the map lamp 10 and the personal lamps 50, when the switch 52 of the illumination portion 50a is pressed to be turned on, electric current flows to the bulb 51 via the switch 52, so that this bulb 51 is lighted. When the switch 52 is again pressed to be turned off, the supply of electric current to the bulb 31 is interrupted, so that the bulb 51 is turned off.

When a mode-changing switch 33 of the map lamp 10 is switched to a door opening/closing mode by operating a thumbpiece 34 of the mode-changing switch 33, a courtesy wire C and a bypass wire P are electrically connected together via the mode-changing switch 33.

In this condition, for example, when the door is opened, the bulbs 31 and 51 are electrically connected to the courtesy wire C via the mode-changing switch 33, the bypass wire P and the respective switches 32 and 52 of the illumination portions 30a and 50a, so that electric current flows to the bulbs 31 and 51 to light them.

In the applied example of FIG. 9, it is not necessary use a plurality of wire harnesses for the map lamp 10 and the plurality of personal lamps 50, and also it is not necessary to branch one wire harness, and the map lamp 10 and the plurality of personal lamps 50 can be arranged on the single wire harness W/H. Therefore, the wire harness W/H can be reduced in length, and the wiring can be simplified. And besides, in the applied example of FIG. 9, not only the number of mode-changing switches 33 can be reduced, but also the light-emitting operation mode-switching function for all of the map lamp 10 and the plurality of personal lamps 50 can be provided in a concentrated manner on the single mode-changing switch 33, and therefore the overall structure of the illumination device can be simplified, and a lightweight design of the illumination device can be achieved, and the cost can be further reduced.

In the above applied example, although the map lamp 10 is of the two-lamp type having the two bulbs 31, the map lamp may be, for example, of the single-lamp type or the three-lamp type. Namely, the map lamp 10 need to have at least one bulb 31. FIG. 10 is a wiring circuit diagram showing a circuit construction of a modified example of the structure of FIG. 9 which includes a map lamp of the three-lamp type. In FIG. 10, similar portions to those of the structure of FIG. 9 will be designated by identical reference numerals, respectively, and explanation thereof will be simplified or omitted.

As shown in FIG. 10, the map lamp 10A includes a mode-changing switch 33, and an illumination portion 30b having a bulb 31.

This illumination portion 30b has a bulb terminal VT electrically connected to the bulb 31, and this bulb terminal VT is electrically connected to a battery wire B. The mode-changing switch 33 includes a switch terminal ST, and a pair of courtesy switch terminals CST. The switch terminal ST is electrically connected to a grounding wire G, and the courtesy switch terminals CST are electrically connected to a courtesy wire C and a bypass wire P, respectively.

When the mode-changing switch 33 of the map lamp 10 is switched to a door mode by operating a thumbpiece 34 of this mode-changing switch 33, the courtesy wire C and the bypass wire P are electrically connected together via this mode-changing switch 33.

In this condition, for example, when the door is opened, electric current flows to the bulb 31 of the illumination portion 30b via the mode-changing switch 33 to light this bulb 31, and also bulbs 31 and 51 of illumination portions 30a and 50a are electrically connected to the courtesy wire C via the bypass wire P and respective switches 32 and 52 of the illumination portions 30a and 50a, so that electric current flows to these bulbs 31 and 51 to light them.

When the door opening/closing mode is canceled by operating the thumbpiece 34 of the mode-changing switch 33, electric current flows to the bulb 31 of the illumination portion 30b via this mode-changing switch 33, so that only the bulb 31 of this illumination portion 30b is lighted.

In this illumination device including the map lamp 10A of the three-lamp type, also, it is not necessary use a plurality of wire harnesses for the map lamp 10A and the plurality of personal lamps 50, and also it is not necessary to branch one wire harness, and the map lamp 10A and the plurality of personal lamps 50 can be arranged on the single wire harness W/H. Therefore, the wire harness W/H can be reduced in length, and the wiring can be simplified. And besides, in the illumination device of FIG. 10, not only the number of mode-changing switches 33 can be reduced, but also the light-emitting operation mode-switching function for all of the map lamp 10A and the plurality of personal lamps 50 can be provided in a concentrated manner on the single mode-changing switch 33 having the illumination function, and therefore the overall structure of the illumination device can be simplified, and a lightweight design of the illumination device can be achieved, and the cost can be further reduced.

The invention is not limited to the above embodiment, and modifications, improvement and so on can be suitably made. The shape, dimensions, numeral values, form, number, disposition, etc., of each of the constituent elements of the above embodiment are arbitrary, and are not limited in so far as the invention can be achieved.

For example, although the bulbs 31 and 51 are used as the light sources of the illumination portions 30a, 30b and 50a, the light sources are not limited to the bulbs, and any other suitable light-emitting element such as a light-emitting diode can be used as the light source.

What is claimed is:

1. An illumination device comprising:
a wire harness including a first conductor, a second conductor, a third conductor and a fourth conductor which are electrically separated from one another;
a plurality of illumination portions;
a mode-changing switch for changing a light-emitting operation mode of said plurality of illumination portions, said mode-changing switch electrically connected to said second conductor and said fourth conductor, and switched between a short-circuited state in which said second conductor and said fourth conductor are electrically connected together and an open state in which said second conductor and said fourth conductor are electrically disconnected from each other;
a switch, provided in each illumination portion, including a first electrical contact, a second electrical contact, a third electrical contact, and an electrical contact member which is movable between a first position where said electrical contact member is disposed in contact with said first and second electrical contacts to electrically connect said first and second electrical contacts together, and is disposed out of contact with said third electrical contact and a second position where said electrical contact member is disposed in contact with said second and third electrical contacts to electrically connect said second and third electrical contacts together, and is disposed out of contact with said first electrical contact;
a light source including a first electrical contact, and a second electrical contact electrically connected to said second electrical contact of said switch;
a first electrical terminal electrically connected to said first electrical contact of said light source and said first conductor;
a second electrical terminal which is electrically connected to said third electrical contact of said switch and said fourth conductor, and can be electrically connected to said second electrical contact of said light source when said electrical contact member of said switch is brought into said second position; and
a third terminal electrically connected to said first electrical contact of said switch and said third conductor.

2. An illumination device according to claim 1, wherein a potential difference is existed between said first conductor and said third conductor, and when said mode-changing switch is in the short-circuited state, and said electrical contact member of said switch of at least one of said plurality of illumination portions is disposed in said second position so as to light said light source of said at least one illumination portion, the potential of said second conductor is generally the same as the potential of said third conductor.

3. An illumination device according to claim 1, in which when said mode-changing switch is in the open state, and said electrical contact members of said switches of said plurality of illumination portions are disposed in their respective first positions, said fourth conductor is in an electrically-floating condition.

4. An illumination device according to claim 1, further comprising:
a first lamp portion including at least two of said plurality of illumination portions, and said mode-changing switch; and
a plurality of second lamp portions each including at least one of said plurality of illumination portions other than said at least two illumination portions of said first lamp portion,
wherein said first lamp portion and said second lamp portions are arranged generally in a row on said wire harness.

5. An illumination device according to claim 1, wherein said wire harness includes a bundle of wires having said first, second, third and fourth conductors, respectively, and each of said wires has an electrically-insulating material covering an outer peripheral surface of said conductor.

6. An illumination device according to claim 1, wherein said wire harness is a flat cable which is integrally molded of an electrically insulating material in such a manner that said first, second, third and fourth conductors are arranged in parallel spaced relation to one another.

7. An illumination device according to claim 1, wherein said illumination device is a vehicle room illumination lamp adapted to be provided within a vehicle room of a vehicle.

8. An illumination device comprising:
a wire harness including a first conductor, a second conductor, a third conductor and a fourth conductor which are electrically separated from one another;
an illumination portion;
a mode-changing switch for changing a light-emitting operation mode of said illumination portion, said mode-changing switch electrically connected to said second conductor and said fourth conductor, and switched between a short-circuited state in which said second conductor and said fourth conductor are electrically connected together and an open state in which said second conductor and said fourth conductor are electrically disconnected from each other;
a switch, provided in said illumination portion, including a first electrical contact, a second electrical contact, a third electrical contact, and an electrical contact member which is movable between a first position where said electrical contact member is disposed in contact with said first and second electrical contacts to electrically connect said first and second electrical contacts together, and is disposed out of contact with said third electrical contact and a second position where said electrical contact member is disposed in contact with said second and third electrical contacts to electrically connect said second and third electrical contacts together, and is disposed out of contact with said first electrical contact;
a light source including a first electrical contact, and a second electrical contact electrically connected to said second electrical contact of said switch;
a first electrical terminal electrically connected to said first electrical contact of said light source and said first conductor;
a second electrical terminal which is electrically connected to said third electrical contact of said switch and said fourth conductor, and can be electrically connected to said second electrical contact of said light source when said electrical contact member of said switch is brought into said second position; and
a third terminal electrically connected to said first electrical contact of said switch and said third conductor.

9. An illumination device according to claim 8, wherein a potential difference is existed between said first conductor and said third conductor, and when said mode-changing switch is in the short-circuited state, and said electrical contact member of said switch of said illumination portion is disposed in said second position so as to light said light source of said illumination portion, the potential of said second conductor is generally the same as the potential of said third conductor.

10. An illumination device according to claim 8, wherein when said mode-changing switch is in the open state, and said electrical contact member of said switch of said illumination portion is disposed in said first position, said fourth conductor is in an electrically-floating condition.

* * * * *